US012469395B2

(12) United States Patent
Agarwal

(10) Patent No.: US 12,469,395 B2
(45) Date of Patent: Nov. 11, 2025

(54) METHOD AND SYSTEM TO FILTER AND SORT CLEARANCES IN AIR TRAFFIC CONTROL (ATC) TRANSCRIPTION

(71) Applicant: HONEYWELL INTERNATIONAL INC., Charlotte, NC (US)

(72) Inventor: Jitender Kumar Agarwal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 710 days.

(21) Appl. No.: 17/812,050

(22) Filed: Jul. 12, 2022

(65) Prior Publication Data

US 2023/0386344 A1 Nov. 30, 2023

(30) Foreign Application Priority Data

May 30, 2022 (IN) ............................. 202211030785

(51) Int. Cl.

*G06F 3/048* (2013.01)
*B64D 43/00* (2006.01)
*G08G 5/21* (2025.01)
*G08G 5/25* (2025.01)

(52) U.S. Cl.

CPC ............... *G08G 5/21* (2025.01); *B64D 43/00* (2013.01); *G08G 5/25* (2025.01)

(58) Field of Classification Search

CPC ............. G08G 5/21; G08G 5/25; B64D 43/00
See application file for complete search history.

(56) References Cited

U.S. PATENT DOCUMENTS 7,747,360 B2 6/2010 Canu-Chiesa et al.
9,262,927 B2 * 2/2016 Populus .................... G08G 5/53
9,371,140 B1 6/2016 Johnson et al.
10,860,115 B1 * 12/2020 Tran ....................... G06F 3/0346
11,509,154 B1 * 11/2022 Ferrier .................. H02J 7/0048
11,582,057 B2 * 2/2023 Ansari ................... G05B 15/02
11,743,226 B2 * 8/2023 Shamasundar .......... G08G 5/21 709/206
11,783,810 B2 * 10/2023 Dame ................... G10L 15/063 704/232
2011/0006918 A1 1/2011 Shafaat et al.
(Continued)

FOREIGN PATENT DOCUMENTS

EP 3226240 A1 10/2017

*Primary Examiner* — David Phantana-angkool
(74) *Attorney, Agent, or Firm* — Ingrassia Fisher & Lorenz, LLP

(57) ABSTRACT

A method of displaying information is provided. The method includes displaying, by a transcription app, a set of traffic operating in airspace of a first category of traffic and second category traffic wherein the first category of traffic includes a set of aircraft that is operating within a defined range to the ownship in comparison to the second category of traffic that includes another set of aircraft that is operating outside the defined range to the ownship; classifying the first category of traffic at the closer distance to the ownship as proximate traffic and the second category of traffic at the further distance to the ownship as non-proximate traffic for enabling at least selection of either the proximate traffic or the non-proximate traffic on the display device for decluttering the display of traffic on the display device.

10 Claims, 4 Drawing Sheets

(56) References Cited

U.S. PATENT DOCUMENTS

| | | | | |
|---|---|---|---|---|
| 2011/0066362 | A1 | 3/2011 | He | |
| 2013/0033387 | A1 | 2/2013 | Trope | |
| 2016/0063999 | A1 | 3/2016 | Gaston et al. | |
| 2017/0287467 | A1 | 10/2017 | Lafon et al. | |
| 2017/0295031 | A1* | 10/2017 | Bush | H04L 63/02 |
| 2018/0218620 | A1* | 8/2018 | Kalyan | G08G 5/34 |
| 2018/0281988 | A1* | 10/2018 | Tellechea | G06F 3/0489 |
| 2019/0244528 | A1* | 8/2019 | Srinivasan | G08G 5/21 |
| 2020/0099651 | A1* | 3/2020 | Shamasundar | G08G 5/53 |
| 2020/0143691 | A1* | 5/2020 | Sidiropoulos | G08G 5/20 |
| 2020/0349852 | A1* | 11/2020 | DiCosola | G08G 5/55 |
| 2021/0312927 | A1* | 10/2021 | Baladhandapani | G08G 5/26 |
| 2023/0356842 | A1* | 11/2023 | Rangan | G06V 40/18 |
| 2023/0386344 | A1* | 11/2023 | Agarwal | G08G 5/723 |

* cited by examiner

METHOD AND SYSTEM TO FILTER AND SORT CLEARANCES IN AIR TRAFFIC CONTROL (ATC) TRANSCRIPTION

CROSS-REFERENCE TO RELATED APPLICATION

This application claims priority to India Provisional Patent Application No. 202211030785, filed May 30, 2022, the entire content of which is incorporated by reference herein.

TECHNICAL FIELD

Embodiments of the subject matter described herein relate generally relate to the display of transcribed messages. More particularly, embodiments of the subject matter relate to systems and methods to enable user review of the displayed message and provide input to reconfigure the transcribed messages for enhanced communication of message content.

BACKGROUND

Messages from Air Traffic Control (ATC) transcriptions include instructions to pilots of action commands that are communicated to ownship pilots that enhance the pilots' situation awareness. For example, action commands that have been requested by the ownship pilot and either granted or denied, provide direct strategic situational awareness to the pilot of an immediate, or future action that is required on the pilot's part.

In embodiments, the above-mentioned message provides a complete picture of all or nearly all aircraft operating in airspace. This is because the channel is broadcast in a manner that allows all the clearances to be distributed to all pilots flying in the airspace or zone. The rationale for this widespread broadcast is for all pilots in the airspace to be kept aware of aircraft operations in their surroundings to assist in navigation and planning to remedy any potential conflicts.

Based on certain distances or range thresholds, aircraft near to the ownship can be considered as proximate traffic (PT) while aircraft operating more remote or at a further distance from the ownship can be considered as non-proximate traffic (NT). The clearances or messages for the proximate traffic (PT) operating near the ownship aircraft can play a greater role in a collision threat due to their traffic range from the ownship. The need to review clearances or messages associated with non-proximate traffic (NT) is therefore of less significance because of the further distance apart and may also interfere with a pilot's efficiency by causing unnecessary pilot head downtime for message review of these less immediately relevant messages.

The time-based trajectory operations, Required Time of Arrival (RTA), and other complex procedures such as Ground Interval Management, Paired Approaches, Flight Interval Management, or In-Trail Procedures can require one aircraft to follow the lead aircraft; therefore, it is helpful for such procedures to know all recent clearance message about a lead aircraft to at least enhance situational awareness of the ownship operation.

Hence, it is desirable to provide a system that conveniently displays selectable traffic that includes a set of proximate traffic (PT) or non-proximate (NT) traffic with associated messages on a display device to reduce the necessary pilot head-down time when reviewing traffic messages and to enhance the pilot's situational awareness by enabling: a pre-filtering operation of a set of relevant messages for pilot review, and collision avoidance operations of the ownship by specifying certain messages that are relevant to Traffic Alert and Collision System (TCAS) operations.

Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an exemplary embodiment, a method of displaying transcribed messages from Air Traffic Control (ATC) communications is provided. The method includes displaying, by a transcription app hosted on a display device, a set of traffic operating in airspace of an ownship wherein the set of traffic is categorized in a first category of traffic and a second category traffic, wherein the first category of traffic includes a set of aircraft that is operating within a defined range to the ownship in comparison to the second category of traffic that includes another set of aircraft that is operating outside the defined range to the ownship wherein the defined range includes a user-configured range or an automatically configured range; classifying, by the transcription app, the first category of traffic operating within the defined range to the ownship as proximate traffic, and the second category of traffic operating outside the defined range to the ownship as non-proximate traffic for enabling at least selection of either messages associated with the proximate traffic or the non-proximate traffic on the display device for decluttering a display of traffic messages on the display device; and generating, by the transcription app, a graphical user interface (GUI) on the display device that is populated with one or more messages associated with each aircraft displayed on the display device from either the first or second category that includes the proximate traffic and the non-proximate traffic wherein the one or more messages are configured for display in a message list associated with each aircraft and have been identified for display in the message list by a flight call sign converted from a flight identifier associated with the aircraft.

In at least one embodiment, the method further includes at least sorting, by the transcription app, the message list of the one or more messages for display in accordance with at least a priority scheme or a time-based sequence wherein the message list is associated with at least one aircraft of either the first or second category of proximate or non-proximate traffic.

In at least one embodiment, the method further includes identifying, using the transcription app, a lead aircraft by a user selection action via the GUI on the display wherein the lead aircraft is from either the proximate or non-proximate traffic, and the message list associated with the lead aircraft is displayed upon the user selection action.

In at least one embodiment, the method further includes validating, by the transcription app, a spoken callsign associated with the one or more messages based on data related to the callsign stored in a callsign database wherein the callsign database is in communication with the transcription app.

In at least one embodiment, the method further includes enabling a set of actions including at least searching and sorting, by the transcription app, one or more messages based on user input via the transcription app wherein the user input includes voice and text input via at least a flight deck and includes at least data related to a flight identification number, the callsign, or certain aircraft parameters.

In at least one embodiment, the method further includes decluttering, by the transcription app, the display of proximate or non-proximate traffic based on the selection or removal of either a set of proximate or non-proximate traffic associated with one or more messages for display.

In at least one embodiment, the method further includes enabling the set of actions including at least selecting and sorting, by the transcription app, one or more messages for display based on proximity or user criteria related to the ownship.

In at least one embodiment, the method further includes enabling the set of actions including selecting and filtering, by the transcription app, one or more messages for display based on user input or automatically by the transcription app in accordance with an ownship heading.

In at least one embodiment, the method further includes filtering, by the transcription app, one or more messages based on at least Automatic Dependent Surveillance (ADS) data and Traffic Information System-Broadcast (TISB) data that is made available to the transcription app wherein the ADS data includes at least parameters that include aircraft type and category.

In at least one embodiment, one or more messages are made available to the transcription app via a data link in a cockpit.

In at least one embodiment, the method further includes displaying, by the transcription app, a set of the one or more messages that are reduced and associated with the aircraft along with an aircraft icon which is expandable upon the user selection action that enables a display of an expanded list of messages wherein a reduced set of one or more messages minimizes pilot review time and post flight analysis.

In another embodiment, a system for displaying aircraft traffic is provided. The system includes a transcription app that is operatively coupled to a display device to display a set of traffic operating in airspace of an ownship wherein the set of traffic is categorized in a first category of traffic and second category traffic wherein the first category of traffic includes a set of aircraft that is operating within a defined range to the ownship in comparison to the second category of traffic that includes another set of aircraft that is operating outside the defined range to the ownship wherein the defined range includes at least a user-configured range; wherein the transcription app is configured with a classifier to classify a first category of traffic operating within the defined range as proximate traffic, and the second category of traffic operating outside the defined range as non-proximate traffic for enabling at least selection of either the proximate traffic or the non-proximate traffic on the display device to cause less clutter on a display of traffic on the display device; and wherein the transcription app is operatively coupled to a graphical user interface (GUI) and is configured with the display device to populate a listing of messages associated with each aircraft on the display device that includes at least one aircraft displayed from either the first or second category including proximate traffic and non-proximate traffic wherein a message list includes a set of one or more messages identified on the display by a flight call sign converted from a flight identifier of the aircraft and is displayed with each message in the message list wherein each message is sequentially identified by the flight call sign.

In at least one embodiment, the system further includes the transcription app that is configured to sort the set of one or more messages of the message for display in accordance with a priority or a time-based sequence wherein the set of one or more messages is associated with the at least one aircraft of either the first or second category of proximate or non-proximate traffic.

In at least one embodiment, the method further includes the transcription app that is configured to identify a lead aircraft by a user selection action via the GUI on the display wherein the lead aircraft is from either the proximate or non-proximate traffic and the message list associated with the lead aircraft is displayed upon the user selection action.

In at least one embodiment, the method further includes the transcription app that is configured to validate a callsign from the one or more messages based on data of the callsign stored in a callsign database wherein the callsign database is in communication with the transcription app.

In at least one embodiment, the method further includes the transcription app that is configured to search one or more messages based on user input that includes at least data related to a flight identification number or the callsign.

In at least one embodiment, the method further includes the transcription app that is configured to declutter the display of proximate or non-proximate traffic based on user input selection of either a set of proximate or non-proximate traffic associated with one or more messages for display.

In at least one embodiment, the method further includes the transcription app that is configured to select one or more messages for display based on proximity or user criteria related to the ownship.

In at least one embodiment, the method further includes the transcription app that is configured to display one or more messages based on user input or automatically by the transcription app in accordance with an ownship heading.

In yet another exemplary embodiment, a non-transitory computer-readable media encoded with programming instructions configurable to cause a controller to perform a method is provided. The method includes displaying a set of traffic operating in airspace of an ownship wherein the set of traffic is categorized in a first category of traffic and second category traffic wherein the first category of traffic includes a set of aircraft that is operating within a defined range to the ownship in comparison to the second category of traffic that includes another set of aircraft that is operating outside the defined range to the ownship wherein the defined range is at least automatically configured; classifying the first category of traffic within the defined range to the ownship as proximate traffic, and the second category of traffic outside the defined range to the ownship as non-proximate traffic for enabling at least selection of either the proximate traffic or the non-proximate traffic on a display device for decluttering a display of traffic on the display device; and generating a graphical user interface (GUI) on the display device that is populated with one or more messages associated with each aircraft displayed on the display device from either the first or second category that includes proximate traffic and non-proximate traffic wherein the one or more messages are configured for display in a message list associated with each aircraft and have been identified for display in the message list by a flight call sign converted from a flight identifier associated with the aircraft.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
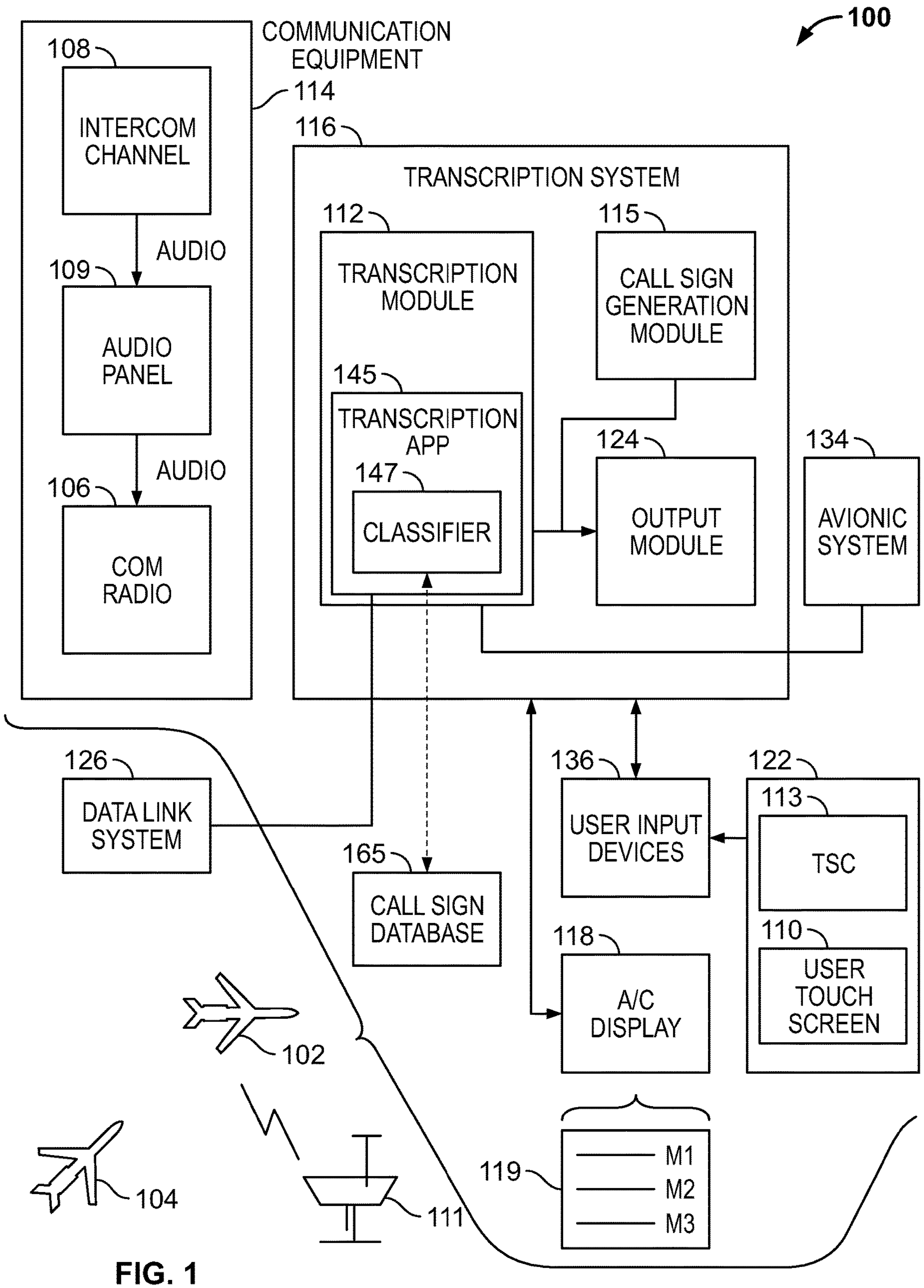
FIG. 1 is a block diagram depicting an example transcription app for a traffic display system for use in a vehicle, such as an aircraft, to review operational information during a mission, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term “module” refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for implementing “Smart TABs” that utilize space dedicated for navigation for data entry, thus producing a more efficient, effective human interface. The apparatus, systems, techniques, and articles provided herein can use display space traditionally allocated singularly to receive user input and multiply their utility by revealing relevant secondary functions and for navigation within a touchscreen controller.

A transcription system can transcribe over-the-air voice communications between air traffic control personnel at a flight operation center (FOC), such as an air traffic controller (ATC), and a flight crew member such as a pilot. Over-the-air communications may include both ownship communications and traffic communications. Ownship communications may include commands from an ATC to an ownship pilot for the pilot to act on. The ownship communications may also include traffic alerts that are communicated to an ownship pilot. Traffic communication may include commands for traffic pilots. Knowledge of traffic communications can provide situational awareness to an ownship pilot. Tasks such as distinguishing ownship communications from traffic communications can increase pilot workload.

The subject matter described herein discloses apparatus, systems, techniques, and articles that are unique in that it combines tabbing navigation structures with an input field. This can reduce flight crew workload and lessen the burdens from task interruptions. The apparatus, systems, techniques, and articles provided herein can make more efficient use of the display area and can increase information density while not increasing perceived clutter.

In various embodiments, the present disclosure describes systems and processes that provide filtering of PT and NT messages and/or selecting of aircraft (based on flight ID, ADS-B data, or TISB data) to filter and display all, nearly all, or a portion thereof of related messages based on criteria associated with the ADS-B data. In various embodiments, also described are systems and processes that sort a set of displayed messages in accordance with selected ADS-B data or TISB data and/or timestamp data per default setting for a graphical user interface that is populated with message data.

FIG. 1 is a block diagram depicting an example flight system and environment 100 such as one around a busy aerodrome. The example system and environment 100 includes a plurality of aerial vehicles (ownship aircraft 102 and traffic aircraft 104 in this example) but could include a variety of types of aerial vehicles such as helicopters, UAVs (unmanned aerial vehicles), and others. The example flight system and environment 100 also includes a plurality of flight operation centers (FOCs) (e.g., air traffic control tower 111) containing control personnel such as air traffic controllers (ATC) for directing ground and air traffic in the vicinity (i.e., with a range) of the aerodrome.

The example avionics equipment shown in FIG. 1 includes communication equipment 114 and an example transcription system 116 for receiving ongoing over-the-air communications and generating formatted text from the over-the-air communications for display onboard an aerial vehicle. The example communication equipment 114 includes a Com radio 106 (such as that known in the art) and an intercom channel 108 (such as that known in the art) for receiving over-the-air communications between various aerial vehicles (ownship and traffic aerial vehicles) and ATC. The example communication equipment 114 also includes an audio panel 109 (such as that known in the art) for accumulating the over-the-air communications from various sources and outputting the audio from the over-the-air communications.

The example ownship aircraft 102 includes avionics equipment that receives the ongoing communications between the aerial vehicles (e.g., 102, 104) and ATC (e.g., via tower 111) using communication equipment 114, and presents the ongoing communications as a continuous stream of audio to a transcription system 116. The transcription system 116 decodes the continuous stream of audio and generates formatted text from the decoded continuous stream of audio and signals an aircraft (A/C) display device 118 to display the generated formatted text for viewing by the flight crew onboard the ownship aircraft 102. The aircraft (A/C) display device 118 may be one of many types of graphical display units onboard an aircraft such as a navigation display, a PFD (primary flight display), a PED (personal electronic device), an EFB (electronic flight bag), HUD (heads up display), HDD (heads-down display), and others. The display of the formatted text may be made via a graphical display page 119 that displays each generated textual message (M1, M2, M3, M4, . . . ) in a manner that visually identifies which messages are directed to the ownship aircraft and which messages are directed to a traffic aircraft.

The example transcription system 116 is configured to receive audio communications from or directed to a flight operating center (FOC) (e.g., an ATC center or some other FOC) via the communication equipment 114 (e.g., via audio panel 109), extract message content from the received audio communications, generate formatted text from the extracted message content, and display the formatted text from the received voice communications onboard the aerial vehicle. The example transcription system 116 is also configured to receive data link communications (DLC) (e.g., CPDLC (controller pilot data link communication)) from or to a Flight Operations Center (FOC) (such as the ATC) via a datalink system 126, extract message content from the DLC, generate formatted text from the extracted message content, and display the formatted text from the received DLC communications onboard the aerial vehicle. In embodiments, the user can via input devices select, sort, filter messages or alerts or weather information and send the report through datalink (ACARS, CPDLC, etc.) air operator's certificate AOC approval based on request. The messages also can be shared through pilot-to-pilot direct datalink or voice link to an aircraft without a transcription facility. Also, a filtered message list that is generated can be sent to any other flight deck/avionics application and displayed in a graphical or textual way. The example transcription system 116 includes a transcription module 112 with a transcription app 145 for extracting message content and a call sign from the received audio communications and the DLC, and an output module 124 for generating formatted text from the extracted message content and call sign, for generating graphics for displaying the formatted text, and for signaling an aircraft display device 118 to display the generated graphics onboard the aerial vehicle.

The example transcription system 116 further includes a call sign generation module 115 for generating an ownship spoken call sign list and a traffic spoken call sign list from their flight identifier or call signs, which can be used to classify received messages on the transcription app 145 that are directed to the ownship or other traffic aircraft. In embodiments, U.S. patent application Ser. No. 17/447,307, entitled SYSTEMS AND METHODS FOR PRESENTING MESSAGES TO FLIGHT CREW, filed on Sep. 10, 2021, is incorporated by reference and describes systems and methods that use a flight identification (ID) of an ownship aircraft and convert it to a spoken callsign. The conversion process uses a callsign database and a set of rules to validate the callsign associated with the ownship. The callsign from the conversion may also be re-used for traffic callsign generation. The messages, configured in the transcription app 145, are each stored with a title configured using the flight identification as the call sign along with a spoken call sign and the user interface (UI) configured in the transcription app 145 populates the data of each record with an associated flight identification of the callsign or spoken callsign for display on a device. The transcription app 145 can be configured with the various avionic systems 134 in the cockpit or hosted by a mobile device such as an iPad, smartphone, or laptop configured with the appropriate settings for connectivity. In an embodiment, the clearance messages are searched or filtered on the transcription app 145 using either the flight identification (ID) or the spoken call sign.

In embodiments, the transcription app 145 can be hosted by a mobile device or integrated into a cockpit system and in communication with various cockpit systems and may include an application that enables categorizing of multiple categories of traffic based on distances to the ownship. In embodiments, the Transcription app 145 may include a classifier 147 for classifying sets of traffic and response to input for displaying different sets of traffic.

In embodiments, the transcription app 145 may be in operable communication with a graphical user interface (GUI) 119 on a display device 118 that may be populated with messages of the different categories associated with each aircraft by the transcription app 145. Further, the transcription app 145 may display a message list associated with each aircraft on the display device 118.

In embodiments, the transcription app 145 may be configured to perform various sorting actions when displaying messages in the message list that include sorting based on a priority scheme or a time-based sequence for both proximate and non-proximate traffic.

In embodiments, the transcription app 145 may enable the selection of a lead aircraft by user input (via user input devices 136) or via the user touchscreen device 110. In embodiments, the transcription app 145 can be configured to validate the callsigns of an aircraft shown on a display by communicating with a callsign database 165 and searching for messages based on callsigns.

In embodiments, the transcription app 145 may enable a declutter process in the display of proximate and non-proximate traffic by displaying either proximate or non-proximate traffic (i.e., traffic operating within/outside a defined range, criteria, or another display setting that is a default of configured setting for the traffic display) based on user selection of either traffic category. In other embodiments, the display of messages may be based on proximity to the ownership, or by default, or user-configured criteria that are applied by the transcription app 145. For example, the message display may be based on user input or automatically displayed by the transcription app based on an ownship heading. In embodiments, the transcription app 145 may filter messages based on Automatic Dependent Surveillance (ADS) data that includes aircraft type and category. In embodiments, the user input can include voice-based input or text input from the user via an avionics display or flight deck. The transcription app 145 is also coupled with a datalink system 126 to receive message data or related message data. In embodiments, the transcription app 145 may enable a display of a reduced set of messages associated with the aircraft along with an aircraft icon which is expandable upon a user action to display an expanded list of messages. In embodiments, the reduced set of messages lessens a pilot's head downtime for scrolling a displayed message list and can enable better efficiency for any post-flight analysis of radio messages or review of all messages of a completed flight.

In embodiments, the transcription app 145 with the output module 124 enables based on received user input from user input devices 136 selecting a graphical display page that displays generated textual messages (M1, M2, M3, M4, . . . ) based on proximity and also can enable the user to deselect or remove certain proximate and non-proximate traffic (i.e., traffic within or outside certain range criteria). This also enables via user selection to declutter a message display of a message list generated by the transcription app 145 and provide more relevant clearances or messages based on user selection as well as proximity to the ownship. Further, the specific aircraft message from PT traffic can be selected or deselected, or even removed from the message that populated the GUI using spoken callsigns or correlated flight ID from input received via the user input devices 136.

Each of the transcription module 112, the output module 124, and the call sign generation module 115 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application-specific integrated circuit (ASIC), a field-programmable gate array (FPGA), an auxiliary processor among several processors associated with the processing component, a semiconductor-based microprocessor (in the form of a microchip or chipset), any combination thereof, or generally any device for executing instructions.

The computer-readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 112 is configured to retrieve message content from a plurality of received messages. The plurality of received messages may include a plurality of CPDLC messages and a plurality of voice messages. The example transcription module 112 is configured to transcribe message content from the plurality of received voice messages to text. The example transcription module 112 is also configured to extract message content from the plurality of received CPDLC messages as text.

The example transcription module 112 is configured to decode the audio from the voice messages using speech recognition techniques to convert the audio into text. The speech recognition techniques may be implemented using machine learning techniques such as deep neural networks, statistical techniques, rule-based systems, and others. The example transcription module 112 may use various techniques such as NLP to convert the text from the audio and/or DLC to formatted text.

The example output module 124 is configured to generate a graphical message element for each of the plurality of received messages that includes a section for displaying a textual representation of the message content for a corresponding received message and a call sign section for displaying an extracted call sign for the aircraft (e.g., ownship or traffic aircraft) to which the received message is directed. The example output module 124 is configured to parse the received message to extract the message content and the recovered call sign.

The message content and recovered call sign for a corresponding received message may include message content and a recovered call sign from a CPDLC message or transcribed message content and recovered call sign from a voice message. The graphical message elements for each of the plurality of received messages may include graphical message elements having message content and a recovered call sign from a CPDLC message and graphical message elements having transcribed message content and a recovered call sign from a voice message.

In one example implementation, the example transcription system 116 is configured to retrieve a plurality of received messages originating from one or more entities outside of the aircraft; extract a call sign from each of the plurality of retrieved messages; generate a graphical message element associated with a retrieved message for each of the plurality of retrieved messages that includes a section for displaying message content extracted from the received message and an extracted call sign for an intended recipient of the associated message, and signal an aircraft display device to display the graphical message elements for each of the plurality of retrieved messages in a manner that indicates whether a retrieved message corresponding to a graphical message element is categorized as a traffic message or an ownship message.

The example call sign generation module 115 is configured to generate an ownship call sign list that includes a plurality of potential ownship call signs that may be used in messages from ATC directed to the ownship and a traffic call sign list for traffic call signs that may be used in messages from ATC directed to traffic aircraft in an area near where the ownship will fly. The ownship call sign list and traffic call sign list may be used in the example transcription system 116 to categorize a retrieved message as a traffic message or an ownship message.

The example touchscreen system 122 is configured with an avionics interface to communicate with the avionics systems 134. The example of touchscreen system 122 includes a touchscreen device 110 and a touchscreen controller (TSC) 112. The example touchscreen device 110 includes a touchscreen surface layered over a visual display. The touchscreen surface is configured to receive user input through single-touch or multi-touch gestures. The visual display is configured to display a graphical user interface (GUI) generated by the controller during the execution of an application program. The GUI may provide one or more widgets for display that may allow for displaying, entering, and/or editing data.

The example TSC 113 includes at least one processor and a computer-readable storage device or media. The processor may be any custom-made or commercially available processor, a central processing unit (CPU), a graphics processing unit (GPU), an application-specific integrated circuit (ASIC), a field-programmable gate array (FPGA), an auxiliary processor among several processors associated with the TSC 113, a semiconductor-based microprocessor (in the form of a microchip or chipset), any combination thereof, or generally any device for executing instructions. The computer-readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller (i.e., TSC 113).

The processors and memory of the example TSC 113 are configured by the executable programming instructions to provide, among other things, a smart tabs module (not shown) for generating graphical control elements (e.g., smart TABs) and one or more applications programs (APPs). The example APPS when executed may cause the generation by the transcription app 145 of display screens (e.g., GUI screens) containing widgets and other graphical elements on the display of the touchscreen device 110. The widgets and other graphical elements on the display screens provide the primary function for display via the GUI 119 and the graphical control elements can supplement the display.

Figure 2:
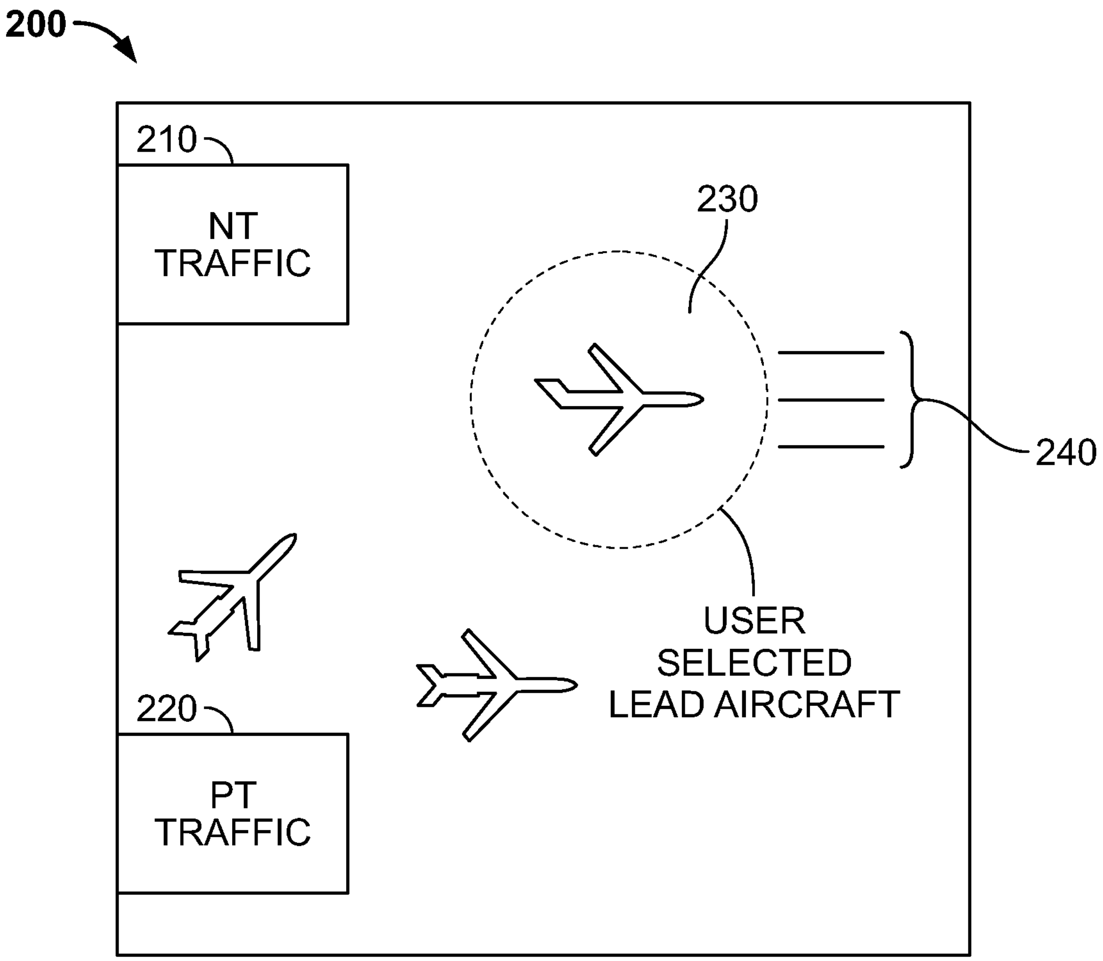
FIG. 2 is a diagram depicting the display of an example GUI page operably coupled to a transcription app that includes the display of graphical elements generated by one or more top-level graphical control elements for selection of proximate or non-proximate traffic, in accordance with some embodiments.

FIG. 2 depicts an example GUI for user selection of NP or PT traffic and for selection on a display of one or more aircraft to review one or more messages associated with the selected one or more aircraft of the transcription display message system in accordance with some embodiments. In FIG. 2, a graphical user interface (GUI) 200 is depicted on a display device. In embodiments, the GUI 200 may be generated by a transcription app and configured on a cockpit display or a display of a connected mobile device. In embodiments, the GUI 200 may be configured with one or more selectable TABs that enable, via touch input or user selection, one or more different display configurations of aircraft traffic on the display. In embodiments, the GUI 200 includes a selectable TAB 210 with an appropriate designation to allow the user (i.e., the pilot) to select via a single step action, traffic that is defined as currently non-proximate traffic with the ownship. Another TAB 220 is also configured with the GUI 200 to enable the user to select traffic that is currently proximate traffic with the ownship. The user may also select an appropriate aircraft 230 from each set of displayed traffic (i.e., proximate or non-proximate traffic) with a snippet of messages 240 that are shown on the GUI 200. Upon, selection of the set of messages or selection of a particular message, the message can be further expanded for a more complete review of the message content while enabling a lesser or limited usage of the display footprint that is available by the GUI 200 and thereby prevent unnecessary overlaying of other aircraft traffic on the display.

Figure 3:
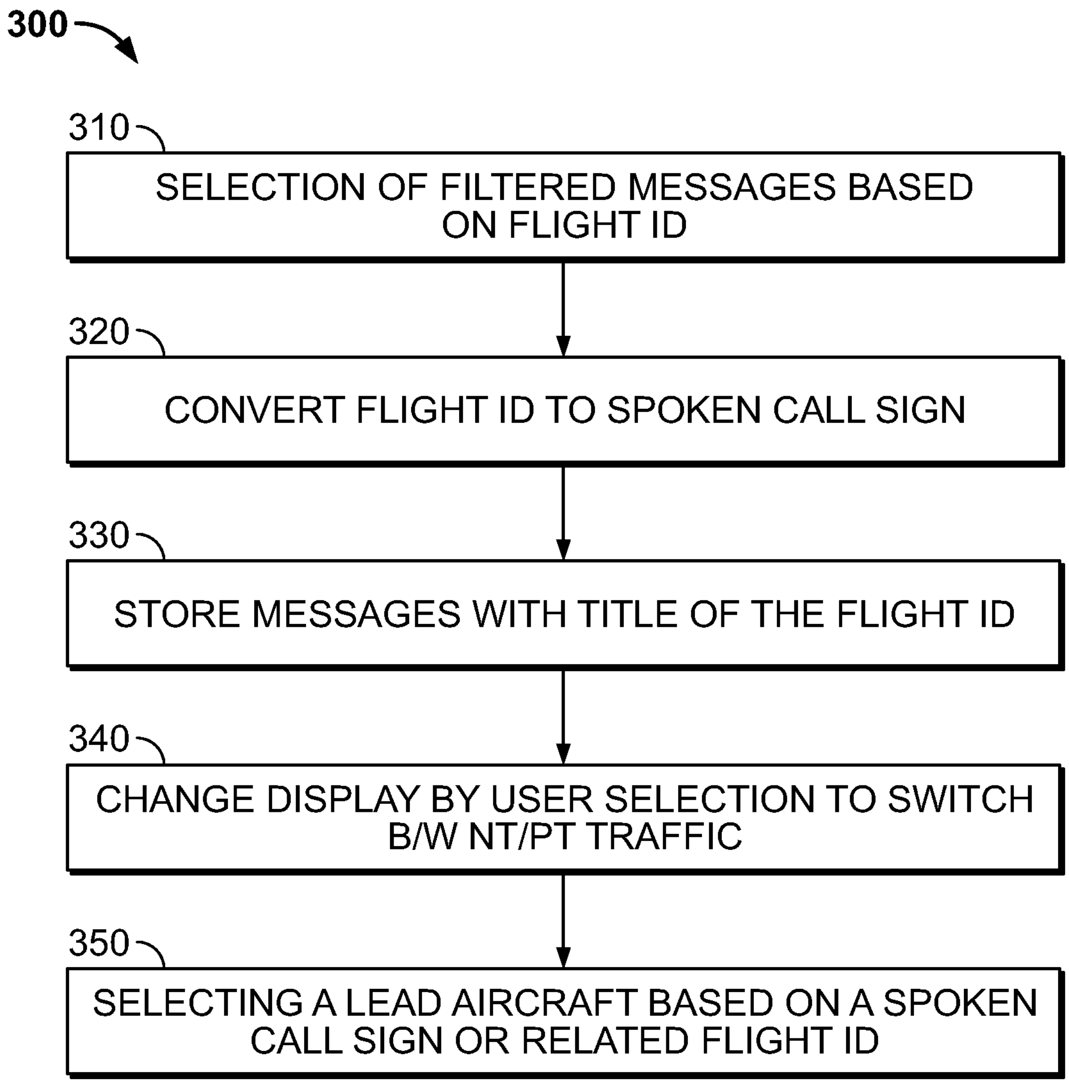
FIG. 3 is a flow diagram depicting the transcription app processes of filtering, selecting, and displaying messages on a display of an example GUI page associated with PT and NT traffic of the transcription message display system, in accordance with some embodiments.

FIG. 3 is a flow diagram that depicts a set of tasks for selecting and filtering clearances based on flight identification and for displaying all PT and NT traffic and generates a traffic list on ascending range where the traffic message list includes the flight identification and ranges and other configurable parameters of the message display system in accordance with an embodiment. As depicted in flowchart 300 of FIG. 3, in step 310, the message system applies a filter operation to generate a subset of filtered clearance messages that are based on the flight identification (ID). The cockpit display displays both the PT and NT traffic and generates traffic lists based on an ascending range or distance between traffic aircraft and the ownship. The traffic list consists of FLIGHT ID, the range of the aircraft, and any other user-selected parameters that are inputted via input devices to the TSC to configure the onscreen display of traffic and associated message lists.

At step 320, the FLIGHT ID of the ownship is converted to the spoken callsign for traffic call sign generation and to validate the call sign at a call sign database. A flight number is assigned to a flight route by the carrier for passenger convenience (e.g., flight123) while a call sign is a name and number that is assigned to a flight for ATC and pilot identification and communications. The flight number and call sign are often the same but not all the time. For example, Delta flight 123 but its call sign (which includes the carrier's name) might be Delta 456. A private aircraft flight will use the aircraft manufacturer (type) and tail/registration number. A Cessna 172, registration N1234 would be "Cessna 1234", A Cessna Citation Jet would use "Citation 1234", US Military use assigned callsigns, for example, USAF transport aircraft often use "Reach" and 2-digit number, USAF Special Airlift missions use SAM and all or part of the tail number. Any USAF aircraft carrying POTUS is designated "Air Force One". Airlines use their agreed upon (with the FAA) designator+the flight number (the same Flight number as is on your ticket). For example, American, Delta, and United use "American", "Delta", and "United", respectively Some carriers have unique identifiers America West was "Cactus" Value Jet was "Critter" British Airways is "Speedbird" Using the ABC Air Flight Number 123, the callsign might be "ABC 123" or something unique to the airline like "Wingnut 123"

At step 330, the transcription module (112 of FIG. 1) stores one or more messages by the transcription app where each message is stored with a title of the FLIGHT ID that is used as a call sign and with the spoken call sign (if different) and the graphical user interface is populated to display the set of messages on the aircraft display. The clearance message, as an example, can then be stored or filtered using either the call sign or the spoken call sign. At step 340, a user can change the display of messages by using a touch screen interface or other user input devices to select and deselect traffic based on proximity. In embodiments, specific messages from PT traffic can be selected or deselected, or removed from populating the graphical user interface using the spoken call sign or a correlated flight ID. For example, the user can select a smaller sub-set of NT traffic and then remove or deselect certain of this NT traffic that is displayed. The result is that the user can manually configure the displayed traffic to declutter the ATC transcription app with certain messages populated in the graphic user interface and provide a set of user-determined relevant and/or required clearance messages or other messages of interest. This in turn leads to a faster grasp on the part of the user of personally relevant message subject matter and an overall better situational awareness by improved information intake and less head downtime during the message review task.

At step 350, the user or the system can use other flight data in the message to identify the lead aircraft in case the flight ID is not correlated with a spoken call sign. In other embodiments, the user can select or tag the lead aircraft spoken call sign or correlated flight ID such that all messages or clearances for a selected lead aircraft can be displayed on a new view or the display for the lead aircraft messages can be configured with or without other NT or PT traffic messages. In an embodiment, a user can select lead aircraft which can then enable the system to request user approval to filter a remaining set of messages based on lead aircraft parameters (such as callsign, altitude, position, heading, etc.) as derived from the message or derived from other sources such as TISB or ADSB data if the TISB or ADS-B data is available.

Also, the user may choose to display only the PT traffic messages without the lead aircraft messages for a different understanding by a set of messages of situational awareness formed only by PT traffic messages.

Figure 4:
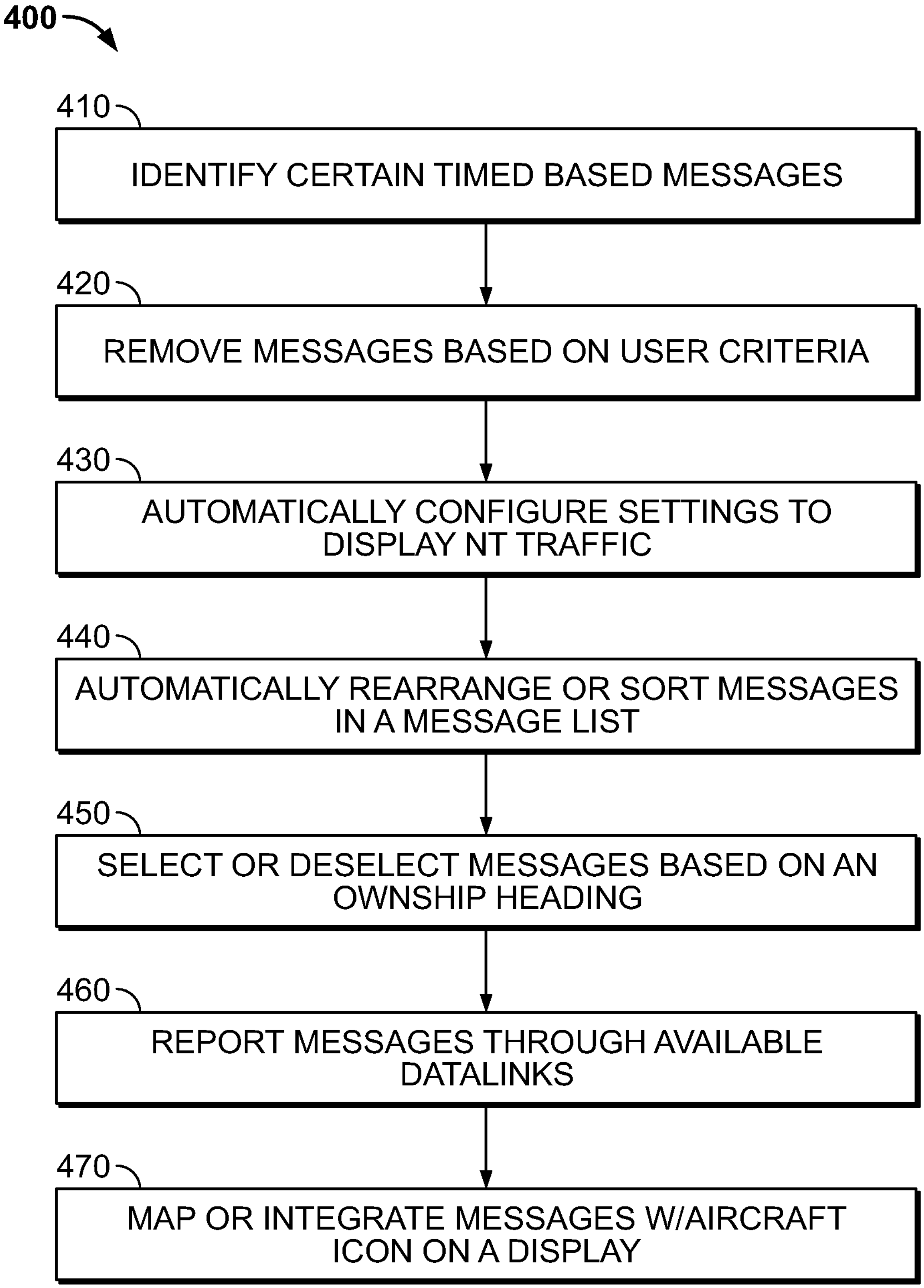
FIG. 4 is a flow diagram depicting the filtering, selecting, and displaying of messages on a display of an example GUI page associated with PT and NT traffic of the transcription message display system, in accordance with some embodiments.

FIG. 4 is a flow diagram 400 of automatic features for the display of time-based strategic messages of the message system in accordance with an embodiment. At step 410, the transcription app is configured to identify time-based strategic messages (related to RTA or TBO) and inactivate the displayed message after elapse of time conditions mentioned in the clearance. The inactive messages may be displayed on the aircraft display (or other display associated with the transcription app) in different colors or different visual attributes for easier identification from a message list. In this instance, the user can easily identify messages by color and can choose to disregard inactive messages based on the message color (i.e., by a cursory high-level visual color-based review) without actually having to digest the message content. In other embodiments, the user can choose to configure the display using the user input setting to set up rules that will automatically scan incoming messages and remove them based on a rule associated with the message display. For example, a rule can be configured to be temporarily removed from an active display, can be archived and can be displayed based on the "display all message" setting (i.e., prevent the populating of the graphical user interface with the inactive messages).

In embodiments, at step 420, the user may configure criteria for the transcription app to automatically filter or remove certain messages based on the inputted criteria. For example, the user may define criteria to automatically select and either delete or archive inactivate messages. The user may also have incoming messages automatically archived or categorized per pre-set categories. In embodiments, the user may enable the automatic deletion of messages from the main view and this can reduce the scrolling list of the main view and decrease the search, filter, or sort time when viewing messages on the main view. The proposed solution also provides the option to text search the clearances by typing a few keywords or numerical data. The search results are shown in highlighted color as defined in the user configuration. Also, these can be arranged or sorted based on time of reception or match relevance.

In embodiments, at step 430, the transcription app can be configured to automatically with the default setting display NT traffic clearances in different visual attributes or remove all NT traffic clearances from populating the graphical user interface. In implementations, the transcription app can be enabled to display alerts or information messages in different visual attributes or remove all alerts or information that is populated in the graphical user interface. In an implementation, the message selection to populate the graphical user interface may be configured at a granular level to enable specific message clearance selection, removal, or display with different visual cues in a present display or a newly generated display that is tailored to the clearance message type.

In embodiments, at step 440, the transcription app can be enabled to automatically rearrange the incoming messages based on priority types as defined on the settings page. For example, the user by manual input via the graphic user interface, can set up or define a set of custom priorities or apply a set of default priorities that apply to different types of messages.

As an example, the transcription app may be provisioned or can be configured either manually or automatically with a list of priorities that are applicable to message display. For example, the list of priorities can be configured in a set of rules or the user can configure customized rules to define priorities that are defined as follows: (1) all ownship messages (i.e., directly sent ownship messages) may be given a higher priority than other traffic messages as well as for those ownship messages that are included with other traffic messages, (2) a traffic alert type of message may be given a low or lower priority than other types of clearance messages, (3) messages that are repeated or repeatedly sent may be given a higher priority than other types of messages, and (4) PT clearance messages may be given a higher priority than NT traffic clearance messages.

In embodiments, at step 450, a user can select or deselect clearance messages based on the ownship heading and course, altitude and flight level, airport destination, and ARTCC center name. In embodiments, the user can select messages based on the query: for example, a user selection can be enabled by a query: "select as the lead, an aircraft ahead of me within 20 nm lateral to me, 1000 feet below me, or 5 min distance behind me". The system will upon execution of the query, find the nearest matched messages and display them to the user. In an embodiment, the system will enable not only one lead aircraft procedure available for tagging of any aircraft message that is associated with the lead aircraft but also multiple lead aircraft procedures that enable queries such as designating "a lead aircraft 30 nm ahead, lead within 10 nm lateral to me" for message tagging with multiple aircrafts that can be configured as a lead aircraft. Further, other aircraft data may be used to filter the clearance messages; for example, if ADS-B data of traffic is available to the transcription application, then the ADS-B data may be used to filter clearance messages. Also, if ADS-B data is available, then associated physical parameters with the ADS-B data such as category or type of aircraft may be used as criteria to filter the messages.

In embodiments, at step 460, the transcription app can be configured to request a set of sorted clearance messages or filtered clearance messages through available datalink available in the cockpit such as Aircraft Communication Addressing and Reporting System (ACARS) or CPDLC or Satellite Communication (SATCOM) or Flight Service Stations (FSS). Further, the TSC can be configured to enable the transfer of a set of sorted or filtered clearance messages through ACARS or SATCOM, or any other available datalink media.

In embodiments, at step 470, the transcription app can be configured to map and integrate the sorted or filtered clearance list of messages with the PT and/or NT traffic displayed onto the Cockpit Display of Traffic Information (CDTI), Navigation (NAV), or Horizontal Situation Indicator (HIS) display and to display a recent or previous set of clearance messages (or a shorten configuration of the recent or previous clearance messages) on the display with the aircraft icon. In a further configuration, upon selection of the aircraft icon or message associated with the aircraft icon, the clearance message can be expanded to take up more footprint in the display and to show a more complete clearance message for review by the user.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic devices, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method of displaying transcribed messages from Air Traffic Control (ATC) communications, the method comprising:

displaying, by a transcription app hosted on a display device, a set of traffic operating in airspace of an ownship wherein the set of traffic is categorized in a first category of traffic and a second category traffic, wherein the first category of traffic comprises a set of aircraft that is operating within a defined range to the ownship in comparison to the second category of traffic that comprises another set of aircraft that is operating outside the defined range to the ownship wherein the defined range comprises a user-configured range or an automatically configured range;

classifying, by the transcription app, the first category of traffic operating within the defined range to the ownship as proximate traffic, and the second category of traffic operating outside the defined range to the ownship as non-proximate traffic for enabling at least selection of either messages associated with the proximate traffic or the non-proximate traffic on the display device for decluttering a display of traffic on the display device;

generating, by the transcription app, a graphical user interface (GUI) on the display device that is populated with one or more messages associated with each aircraft displayed on the display device from either the first or second category that comprises the proximate traffic and the non-proximate traffic wherein the one or more messages are configured for display in a message list associated with each aircraft and have been identified for display in the message list by a flight call sign converted from a flight identifier associated with the aircraft;

sorting, by the transcription app, the message list of the one or more messages for display in accordance with at least a priority scheme or a time-based sequence wherein the message list is associated with at least one aircraft of either the first or second category of proximate or non-proximate traffic;

identifying, using the transcription app, a lead aircraft by a user selection action via the GUI on the display wherein the lead aircraft is from either the proximate or non-proximate traffic, and the message list associated with the lead aircraft is displayed upon the user selection action;

validating, by the transcription app, a spoken callsign associated with the one or more messages based on data related to the callsign stored in a callsign database wherein the callsign database is in communication with the transcription app;

enabling a set of actions comprising at least searching and sorting, by the transcription app, one or more messages based on user input via the transcription app wherein the user input includes voice and text input via at least a flight deck and comprises at least data related to a flight identification number, the callsign, or certain aircraft parameters; and decluttering, by the transcription app, the display of proximate or non-proximate traffic based on selection or removal of either a set of proximate or non-proximate traffic associated with one or more messages for display.

2. The method of claim 1, further comprising:

enabling the set of actions comprising at least selecting and sorting, by the transcription app, one or more messages for display based on proximity or user criteria related to the ownship.

3. The method of claim 2, further comprising:

enabling the set of actions comprising selecting and filtering, by the transcription app, one or more messages for display based on user input or automatically by the transcription app in accordance with an ownship heading.

4. The method of claim 3, further comprising:

filtering, by the transcription app, one or more messages based on at least Automatic Dependent Surveillance (ADS) data and Traffic Information System-Broadcast (TISB) data that is made available to the transcription app wherein the ADS data comprises at least parameters that comprise aircraft type and category.

5. The method of claim 4, wherein one or more messages are made available to the transcription app via a data link in a cockpit.

6. The method of claim 5, further comprising:

displaying, by the transcription app, a set of the one or more messages that are reduced and associated with the aircraft along with an aircraft icon which is expandable upon the user selection action that enables a display of an expanded list of messages wherein a reduced set of one or more messages minimizes pilot review time and post flight analysis.

7. A system for displaying aircraft traffic comprising:

a transcription app that is operatively coupled to a display device to display a set of traffic operating in airspace of an ownship wherein the set of traffic is categorized in a first category of traffic and second category traffic wherein the first category of traffic comprises a set of aircraft that is operating within a defined range to the ownship in comparison to the second category of traffic that comprises another set of aircraft that is operating outside the defined range to the ownship wherein the defined range comprises at least a user-configured range;

wherein the transcription app is configured with a classifier to classify a first category of traffic operating within the defined range as proximate traffic, and the second category of traffic operating outside the defined range as non-proximate traffic for enabling at least selection of either the proximate traffic or the non-proximate traffic on the display device to cause less clutter on a display of traffic on the display device;

wherein the transcription app is operatively coupled to a graphical user interface (GUI) and is configured with the display device to populate a listing of messages associated with each aircraft on the display device that comprises at least one aircraft displayed from either the first or second category comprising proximate traffic and non-proximate traffic wherein a message list includes a set of one or more messages identified on the display by a flight call sign converted from a flight identifier of the aircraft and is displayed with each message in the message list wherein each message is sequentially identified by the flight call sign;

wherein the transcription app is configured to sort the set of one or more messages of the message for display in accordance with a priority or a time-based sequence wherein the set of one or more messages is associated with the at least one aircraft of either the first or second category of proximate or non-proximate traffic;

wherein the transcription app is configured to identify a lead aircraft by a user selection action via the GUI on the display wherein the lead aircraft is from either the proximate or non-proximate traffic and the message list associated with the lead aircraft is displayed upon the user selection action;

wherein the transcription app is configured to validate a callsign from the one or more messages based on data of the callsign stored in a callsign database wherein the callsign database is in communication with the transcription app;

wherein the transcription app is configured to search one or more messages based on user input that comprises at least data related to a flight identification number or the callsign; and wherein the transcription app is configured to declutter the display of proximate or non-proximate traffic based on user input selection of either a set of proximate or non-proximate traffic associated with one or more messages for display.

8. The system of claim 7, further comprising:

wherein the transcription app is configured to select one or more messages for display based on proximity or user criteria related to the ownship.

9. The system of claim 8, further comprising:

wherein the transcription app is configured to display one or more messages based on user input or automatically by the transcription app in accordance with an ownship heading.

10. A non-transitory computer-readable media encoded with programming instructions configurable to cause a controller to perform a method, the method comprising:

displaying a set of traffic operating in airspace of an ownship wherein the set of traffic is categorized in a first category of traffic and second category traffic wherein the first category of traffic comprises a set of aircraft that is operating within a defined range to the ownship in comparison to the second category of traffic that comprises another set of aircraft that is operating outside the defined range to the ownship wherein the defined range is at least automatically configured;

classifying the first category of traffic within the defined range to the ownship as proximate traffic, and the second category of traffic outside the defined range to the ownship as non-proximate traffic for enabling at least selection of either the proximate traffic or the non-proximate traffic on a display device for decluttering a display of traffic on the display device;

generating a graphical user interface (GUI) on the display device that is populated with one or more messages associated with each aircraft displayed on the display device from either the first or second category that comprises proximate traffic and non-proximate traffic wherein the one or more messages are configured for display in a message list associated with each aircraft and have been identified for display in the message list by a flight call sign converted from a flight identifier associated with the aircraft;

sorting, by the transcription app, the message list of the one or more messages for display in accordance with at least a priority scheme or a time-based sequence wherein the message list is associated with at least one aircraft of either the first or second category of proximate or non-proximate traffic;

identifying, using the transcription app, a lead aircraft by a user selection action via the GUI on the display wherein the lead aircraft is from either the proximate or non-proximate traffic, and the message list associated with the lead aircraft is displayed upon the user selection action;

validating, by the transcription app, a spoken callsign associated with the one or more messages based on data related to the callsign stored in a callsign database wherein the callsign database is in communication with the transcription app;

enabling a set of actions comprising at least searching and sorting, by the transcription app, one or more messages based on user input via the transcription app wherein the user input includes voice and text input via at least a flight deck and comprises at least data related to a flight identification number, the callsign, or certain aircraft parameters; and decluttering, by the transcription app, the display of proximate or non-proximate traffic based on selection or removal of either a set of proximate or non-proximate traffic associated with one or more messages for display.

* * * * *